(12) United States Patent
Chhabra

(10) Patent No.: US 9,894,616 B2
(45) Date of Patent: Feb. 13, 2018

(54) DELEGATING WIFI NETWORK DISCOVERY AND TRAFFIC MONITORING

(71) Applicant: Apple Inc., Cupertino, CA (US)

(72) Inventor: Kapil Chhabra, Milpitas, CA (US)

(73) Assignee: APPLE INC., Cupertino, CA (US)

( * ) Notice: Subject to any disclaimer, the term of this patent is extended or adjusted under 35 U.S.C. 154(b) by 123 days.

(21) Appl. No.: 14/889,428

(22) PCT Filed: Mar. 19, 2014

(86) PCT No.: PCT/US2014/031243
§ 371 (c)(1),
(2) Date: Nov. 5, 2015

(87) PCT Pub. No.: WO2014/182377
PCT Pub. Date: Nov. 13, 2014

(65) Prior Publication Data
US 2016/0100369 A1    Apr. 7, 2016

(30) Foreign Application Priority Data

May 6, 2013    (WO) ................ PCT/US2013/039781

(51) Int. Cl.
*H04W 52/02*    (2009.01)
*H04W 48/16*    (2009.01)
(Continued)

(52) U.S. Cl.
CPC ..... *H04W 52/0274* (2013.01); *H04W 40/244* (2013.01); *H04W 48/16* (2013.01);
(Continued)

(58) Field of Classification Search
CPC .............. H04W 40/244; H04W 48/16; H04W 52/0229; H04W 52/0274; H04W 84/12; H04W 88/02; Y02B 60/50
(Continued)

(56) References Cited

U.S. PATENT DOCUMENTS

| 7,561,898 B2 | 7/2009 | Seo |
| 7,907,562 B2 | 3/2011 | Murty et al. |

(Continued)

FOREIGN PATENT DOCUMENTS

| KR | 10-2005-0054404 | 6/2005 |
| KR | 10-2012-0101504 A | 9/2012 |
| WO | WO-2011/068983 A1 | 6/2011 |

OTHER PUBLICATIONS

Korean Office Action from Korean Patent Application No. 10-2015-7032583, dated Mar. 29, 2017.
(Continued)

*Primary Examiner* — Stephen J Clawson
(74) *Attorney, Agent, or Firm* — McDermott Will & Emery LLP

(57) ABSTRACT

A wireless device configured to delegate it communications and traffic monitoring tasks to a paired device when a wireless transceiver of the wireless device is found to be in an idle state is provided. The wireless device includes two wireless transceivers, the first wireless transceiver for communicating with a wireless access point and second low power wireless transceiver for communicating with a paired device. When the wireless device determines that the first wireless transceiver is in an idle state, it can place the first wireless transceiver into a sleep mode and delegate to the paired device via the second wireless transceiver communication and traffic monitoring tasks that would have been performed by the first wireless transceiver if it were not in a sleep mode.

25 Claims, 5 Drawing Sheets

(51) Int. Cl.
  *H04W 40/24* (2009.01)
  *H04W 84/12* (2009.01)
  *H04W 88/02* (2009.01)
(52) U.S. Cl.
  CPC ........ *H04W 52/0229* (2013.01); *H04W 84/12* (2013.01); *H04W 88/02* (2013.01); *Y02B 60/50* (2013.01)
(58) Field of Classification Search
  USPC .......................................................... 370/311
  See application file for complete search history.

(56) References Cited

U.S. PATENT DOCUMENTS

| | | | |
|---|---|---|---|
| 9,298,244 B2* | 3/2016 | Gossain | H04W 52/0212 |
| 2003/0177267 A1* | 9/2003 | Orava | H04L 29/12264 |
| | | | 709/245 |
| 2004/0120279 A1 | 6/2004 | Huckins | |
| 2005/0186906 A1 | 8/2005 | Hussmann | |
| 2006/0217147 A1 | 9/2006 | Olvera-Hernandez | |
| 2008/0025277 A1 | 1/2008 | Takatori et al. | |
| 2011/0302278 A1 | 12/2011 | Shim | |
| 2013/0012220 A1 | 1/2013 | Waris et al. | |
| 2013/0028162 A1 | 1/2013 | Radulescu et al. | |
| 2014/0187163 A1* | 7/2014 | Fujita | H04W 4/008 |
| | | | 455/41.2 |
| 2014/0206346 A1* | 7/2014 | Kiukkonen | H04W 52/0229 |
| | | | 455/426.1 |
| 2015/0189461 A1* | 7/2015 | Pang | H04W 4/008 |
| | | | 455/41.1 |
| 2016/0080958 A1* | 3/2016 | Rinne | H04W 24/10 |
| | | | 370/338 |
| 2016/0100369 A1* | 4/2016 | Chhabra | H04W 52/0274 |
| | | | 370/311 |
| 2016/0353382 A1* | 12/2016 | Xue | H04W 52/0251 |

OTHER PUBLICATIONS

International Search Report dated Mar. 20, 2014, for International Application No. PCT/US2013/039781, filed May 6, 2013, six pages.
International Search Report dated Nov. 6, 2014, for International Application No. PCT/US2014/031243, filed Mar. 19, 2014, five pages.
He, et al., "Scheduled PSM for Minimizing Energy in Wireless LANs," IEEE 2007 International Conference on Network Protocols, Oct. 2007, pp. 154-163.
Extended European Search Report and Written Opinion dated Nov. 11, 2016, which issued in European Application No. 14794238.7.

* cited by examiner

DELEGATING WIFI NETWORK DISCOVERY AND TRAFFIC MONITORING

CROSS-REFERENCE TO RELATED APPLICATIONS

This application is a National Phase application under 35 U.S.C. § 371 of International Application No. PCT/US2014/031243, filed Mar. 19, 2014, which claims the priority benefit of International Application No. PCT/US2013/039781, filed May 6, 2013, the contents of which are hereby incorporated by reference in their entireties for all intended purposes.

FIELD OF THE DISCLOSURE

This relates generally to wireless communication between computing devices and WiFi access points, and more particularly to the delegation of WiFi network discovery and traffic monitoring between computing devices.

BACKGROUND OF THE DISCLOSURE

Computing devices such as desktop computers, laptop computers, mobile phones, smartphones, watches, tablet devices and portable multimedia players are popular. These computing devices can be used for performing a wide variety of tasks, from the simple to the most complex.

In some instances, computing devices can communicate wirelessly over wireless networks. For example, computing devices can communicate over wireless networks based on the Institute of Electrical and Electronics Engineers (IEEE) 802.11 family of standards, also referred to as "WiFi". The standards (including 802.11a, 802.11b, and 802.11g) define frequency, modulation, data rates, and message formats for communicating information between devices. In general, in an 802.11 compliant wireless network (also referred to as a "WiFi network"), there is a designated "access point," often with a wired connection to the Internet, that manages the WiFi network. Among other operations, the access point can route messages between networked client devices. The WiFi network often has a name (generally configurable by a network administrator interfacing with the access point,) which the access point can periodically broadcast, and client devices that know the name or can discover the network name from the access point's broadcast can join the network by sending requests to join the access point. In some cases, the requests can additionally include a password or access key. Computing devices can communicate wirelessly over other communication standards as well. For example, computing devices can use Bluetooth, Bluetooth Low Energy (LE), Zigbee, etc.

Certain activities performed by wireless devices that are associated with being connected to a WiFi can consume a large amount of power, and thus may make wireless connectivity impractical or unachievable for smaller devices such as a watch or other wearable devices which may have a very small battery with limited power capabilities.

SUMMARY

This relates to a wireless device that can delegate certain communication tasks to a paired device in order to minimize battery usage. The wireless device can be configured to detect when its wireless transceiver is in an idle state and can then send a signal to a paired device via second low power wireless transceiver, alerting the paired device that it is going to place its wireless transceiver into a sleep/standby state and letting the paired device know that it needs to assume responsibility for communications tasks such as searching for known SSIDs, monitoring for traffic intended for the wireless device, and monitoring for ARP requests on behalf of the wireless device

DETAILED DESCRIPTION

In the following description of examples, reference is made to the accompanying drawings which form a part hereof, and in which it is shown by way of illustration specific examples of the disclosure that can be practiced. It is to be understood that other examples can be used and structural changes can be made without departing from the scope of the examples of this disclosure.

This relates to a method of delegating the WiFi network discovery and traffic monitoring tasks associated with a device's acquisition and membership in a wireless network to another a paired device, while the delegating device's WiFi radio is in a sleep or standby mode.

Although examples disclosed herein may be described and illustrated herein in terms of the IEEE 802.11 standard communications protocol, it should be understood that the examples are not so limited, but are additionally applicable to other wireless communications protocols in which communication tasks can be delegated between devices. Furthermore, although examples may be described and illustrated herein in terms of wireless routers acting as wireless access points, it should be understood that the examples are also applicable to servers and other computing devices which can act as wireless access points.

Figure 1:
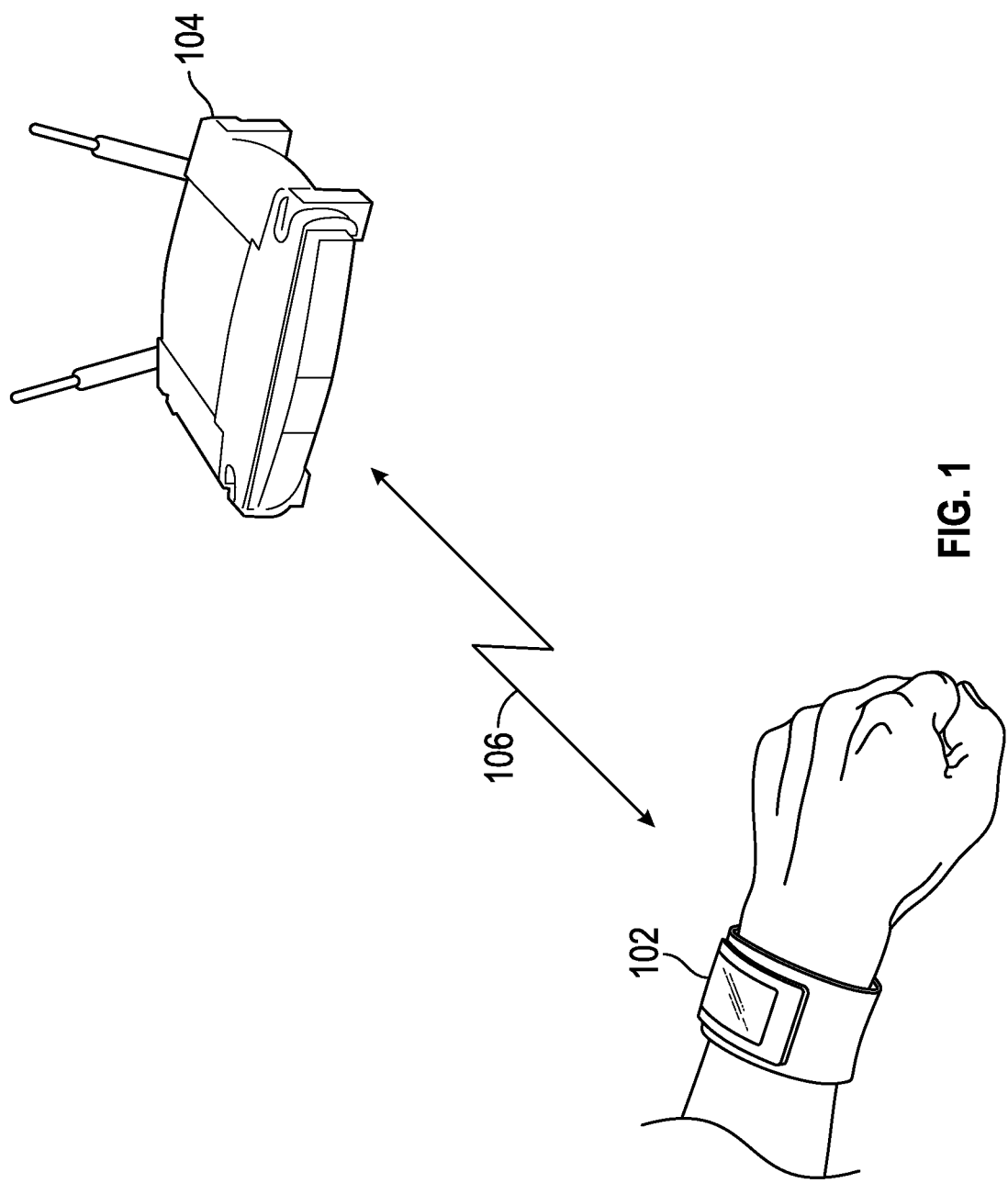
FIG. 1 illustrates a communication link between a wireless device and a wireless access point according to examples of the disclosure.

FIG. 1 illustrates a communication link between a wireless device and a wireless access point according to examples of the disclosure. Wireless device 102 can be linked to wireless access point 104 via wireless communication link 106. Wireless device 102 could be any portable or non-portable electronic device that has the ability to connect to a computer network wirelessly. Wireless access point 104 could be, for instance, a wireless router that allows wireless devices such as the one depicted at 102 to establish connections to it. Wireless access point 104 can be hard wired to the Internet using a standard Ethernet cable, and can provide Internet connectivity to devices connected to it such as device 102. As mentioned above, link 106 can be established using the IEEE 802.11 protocol.

The link can be established as follows. Wireless access point 104 can broadcast its presence periodically to alert proximate devices that it is available for connection. In one example, wireless access point 104 can broadcast a service set identifier (SSID) at periodic intervals to alert devices that are in proximity to its presence. A user of the device 102 can prompt the device to seek out wireless access points. Upon being prompted, device 102 can begin to "scan" for SSIDs being broadcast by wireless access points that are nearby. Once the scan is complete, the device 102 can present a list of found SSIDs, the user can then pick a wireless access point to connect with, and the link can be established per IEEE 802.11.

Once the user selects a particular SSID, the SSID can be stored on the device such as on a list for future reference. In the future, the device can periodically scan for SSIDs without being prompted by the user. If the device 102 encounters an SSID of a wireless access point that is on the list, it can automatically connect to the wireless access point without being prompted by the user. The list can be populated with one or more SSID's that have been connected to in the past, such as a home network, a work network, school network, etc. If a known network, i.e., a network from the list, is encountered by the device during its periodic scans, the device can first recognize that it has encountered an SSID from the list, and then automatically connect to it without requiring any prompting from the user.

In order to search for known wireless access points, the device can periodically scan for broadcasting access points. This periodic scan can require power, and can cause a battery on the wireless device to be drained over time. This problem may appear insignificant to devices which have large or robust batteries; however, for smaller devices such as a smart watch or other wearable wireless accessories, a robust or large battery may not be feasible.

Figure 2:
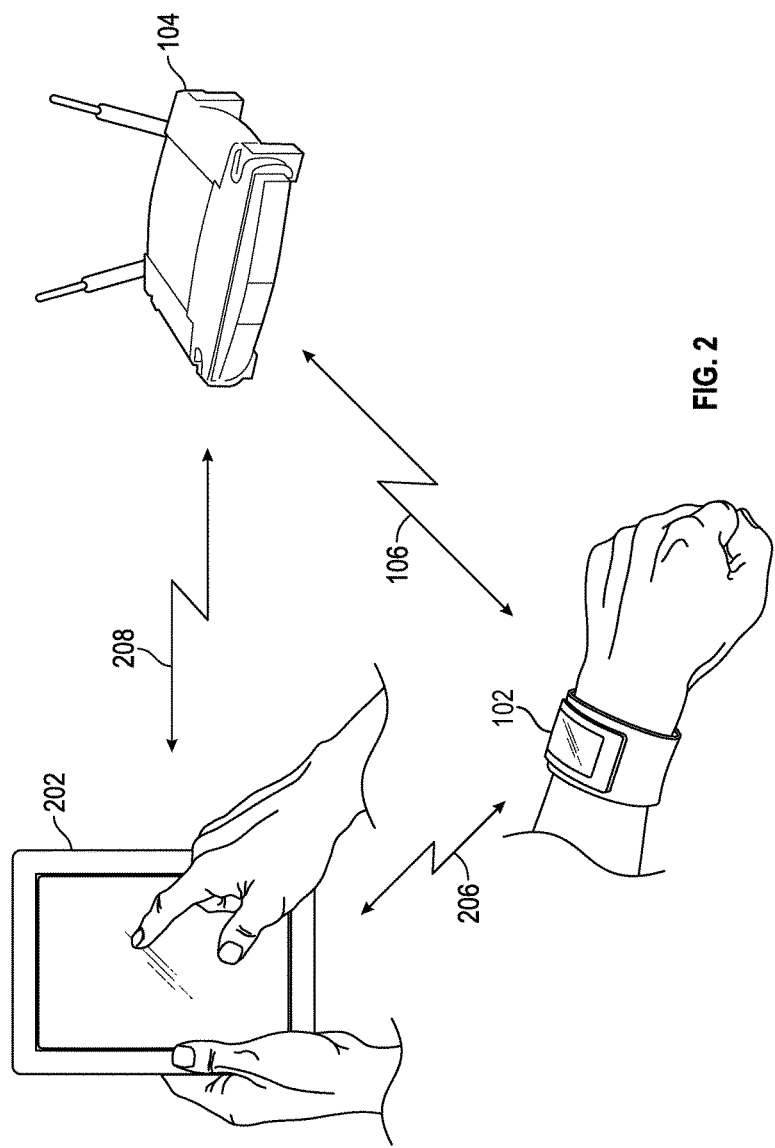
FIG. 2 illustrates an exemplary wireless device paired with another wireless device in order to delegate its WiFi network discovery to the paired device according to examples of the disclosure.

FIG. 2 illustrates an exemplary wireless device paired with another wireless device in order to delegate its WiFi network discovery to the paired device according to examples of the disclosure. In this example, wireless device 102 can be paired with wireless device 202 (herein referred to as paired device 202). Pairing can refer to wireless device 102 and paired device 202 establishing a direct communications link with one another. In some examples, wireless device 102 and paired device 202 can establish a communications link 206 using Bluetooth LE and its associated communications protocol. Bluetooth LE is used only as an example and the disclosure is not so limited, and can also include other known communication methods such as near field communication protocols (NFC). Once a link has been established between wireless device 102 and paired device 202, thus making the devices paired together, wireless device 102 and paired device 202 can share information with each other, then can assist wireless device 102 with operation in a low power mode. In some examples, if wireless device 102 is paired with device 202, then if the wireless device 102 scans for known SSIDs after a pre-determined time period it can detect that the wireless transceiver is in an idle state and the wireless radio (i.e., transceiver) of the wireless device can shut off to preserve battery power. Shutting off the wireless transceiver can be used to describe operating the transceiver in a lower power state, in a sleep mode, or in a stand by mode. Each of these terms can be used interchangeably. An idle state can be defined as when the wireless transceiver has not received data for a pre-determined amount time. Before shutting off, however, wireless device 102 can send a message to paired device 202, indicating that it is about to enter into a idles state i.e., low power mode and can instruct paired device 202 to continue scanning for known SSIDs.

Wireless device 102 can, at the time of apprising paired device 202 that it is going to shut its WiFi radio off, transmit its stored list of known SSIDs 108 of FIG. 1 to paired device 202. Once the list of known SSIDs 108 is received by paired device 202, it can continue to scan for known SSIDs not only for itself, but also for the wireless device 102. Paired device 202 can thus assume the responsibility of searching for known SSIDs on behalf of wireless device 102. If paired device 202 encounters a wireless access point 104 with an SSID that appears on the list provided by wireless device 102, it can then transmit a message to wireless device 102 to exit its sleep mode. Wireless device 102 can then turn its WiFi radio/transceiver on and receive subsequent SSID broadcasts emanating from wireless access point 104.

In other examples, wireless device 102 can communicate with paired device 202 that it is about to put its wireless transceiver into a sleep mode via communications link 206. However, instead of transmitting its list of known SSIDs to paired device 202, the list can be accessed by the paired device by accessing a cloud computing infrastructure in which the list can be stored. Therefore, in some examples, when wireless device 102 adds a new SSID to its list of known SSIDs, that list can periodically be transmitted by wireless device 102 to the cloud. When paired device 202 is scanning for known SSIDs on behalf of wireless device 102, it can access the list of known SSIDs of wireless device 102 on the cloud.

Figure 3:
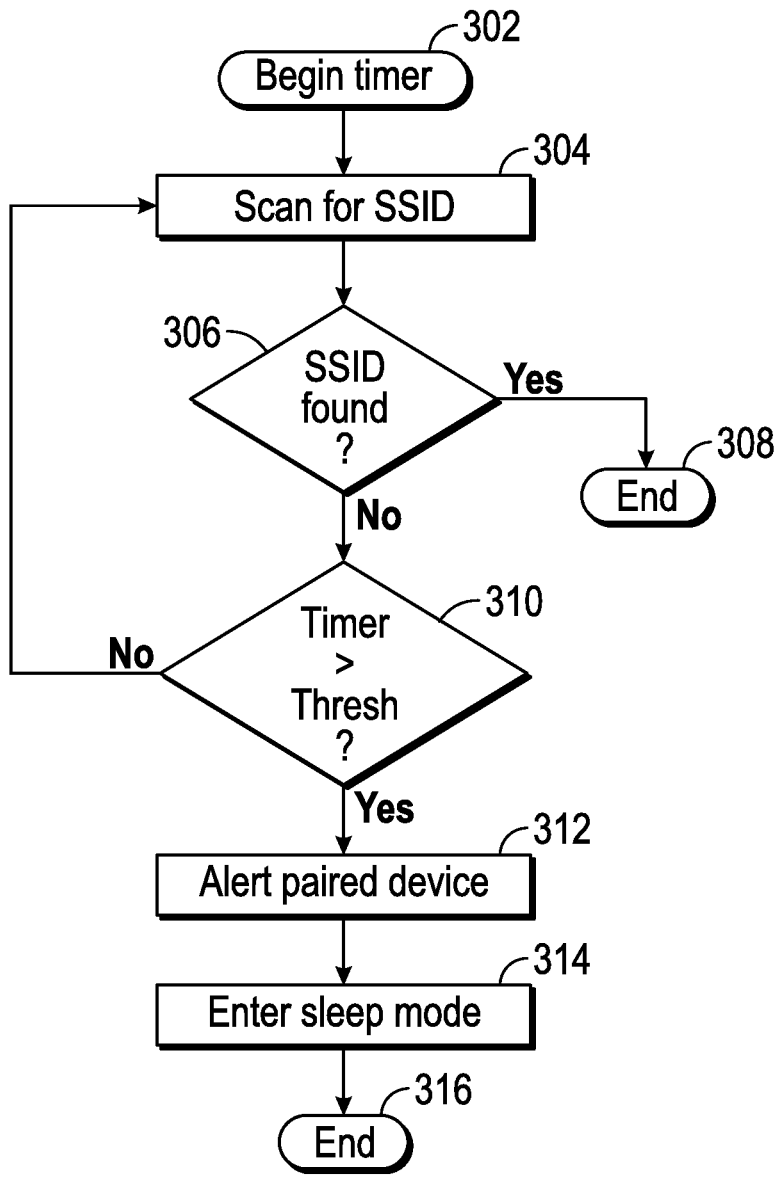
FIG. 3 illustrates an example method of a wireless device delegating its network discovery functions to a paired device according to examples of the disclosure.

FIG. 3 illustrates an example method of a wireless device delegating its network discovery functions to a paired device according to examples of the disclosure. At step 302 a timer can be started which can time how long the wireless device has been trying to acquire a known SSID from a known wireless access point. At step 304 the device can begin to scan for known SSIDs. At step 306, if a known SSID has been found, the process can terminate at step 308. If no known SSID has been found, the process can move to step 310. At step 310, the current value of the timer can be compared against a pre-determined threshold. If the time on the timer is less than the pre-determined threshold, the method can go back to step 304 and begin scanning again for known SSIDs. If, however, the timer is greater than the predetermined threshold, the process can move to step 312 in which the wireless device can alert the paired device that it is about to enter a WiFi sleep mode as described above. The wireless device can alert the paired device by sending a message or data across a low power transmitter using Bluetooth LE as described above. At step 312, the wireless device can transmit its known SSID list to the paired device as described above. The process can then move to step 314 in which the device can enter the WiFi sleep mode, and finally end at step 316.

In addition to scanning for known SSIDs, a wireless device can also delegate other network scanning functions to a paired device, and a paired device can assume the responsibility for those network scanning function on behalf of the wireless device. For instance, in normal operation of a 802.11 network, the wireless access point can periodically broadcast "beacons" to devices that are on the network. Beacons can provide information to devices on the network regarding data that is being received by the wireless access point. Beacons can also be transmitted at periodic intervals, for instance every 100 ms. When a wireless device is synchronized to a wireless access point, it can know at what time the wireless access point will transmit a beacon. When the wireless device knows that the wireless access point will be transmitting a beacon, the device can activate its wireless radio to receive the beacon. The beacon can contain information that the device needs to receive Internet traffic. For instance, in WiFi networks, each device associated with the network carries an association ID (AID) that the wireless access point uses to identify devices on the network. As part of its transmission of a beacon, a wireless access point can transmit what is known as a traffic indication map (TIM). When the wireless router receives data (from the internet or from another device on the local network)information from the Internet, as an example, that is intended for a particular associated device on the network, it can list the association ID's of the devices that have pending data on the network on its TIM. As part of broadcasting beacons, the wireless access point can broadcast its TIM. When a wireless device receives a beacon, it can look to the TIM to see if there is pending traffic intended for it, and if it finds that there is traffic on the network for it can proceed to download the information from the wireless access point.

However, as described above, if a wireless device has put itself in WiFi sleep mode and deactivated its WiFi radio, the device can no longer receive beacons and thus may miss data received by the wireless access point that is intended for it. Therefore, in addition to scanning for known SSIDs, after the wireless device and the paired device are connected to the same access point, a wireless device can also delegate its traffic monitoring functions to a paired device. For example, in reference to FIG. 2, when wireless device 102 desires to enter into WiFi sleep mode, it can also transmit it AID to paired device 202. Paired device 202, as part of it usual operation, can scan for beacons sent by the wireless access point 104. When paired device sees that the TIM transmitted by the wireless access point indicates that there is traffic associated with the AID of the wireless device 102, it can alert the wireless device via communication link 206 to exit WiFi sleep mode so that the wireless device can receive the incoming traffic.

Figure 4:
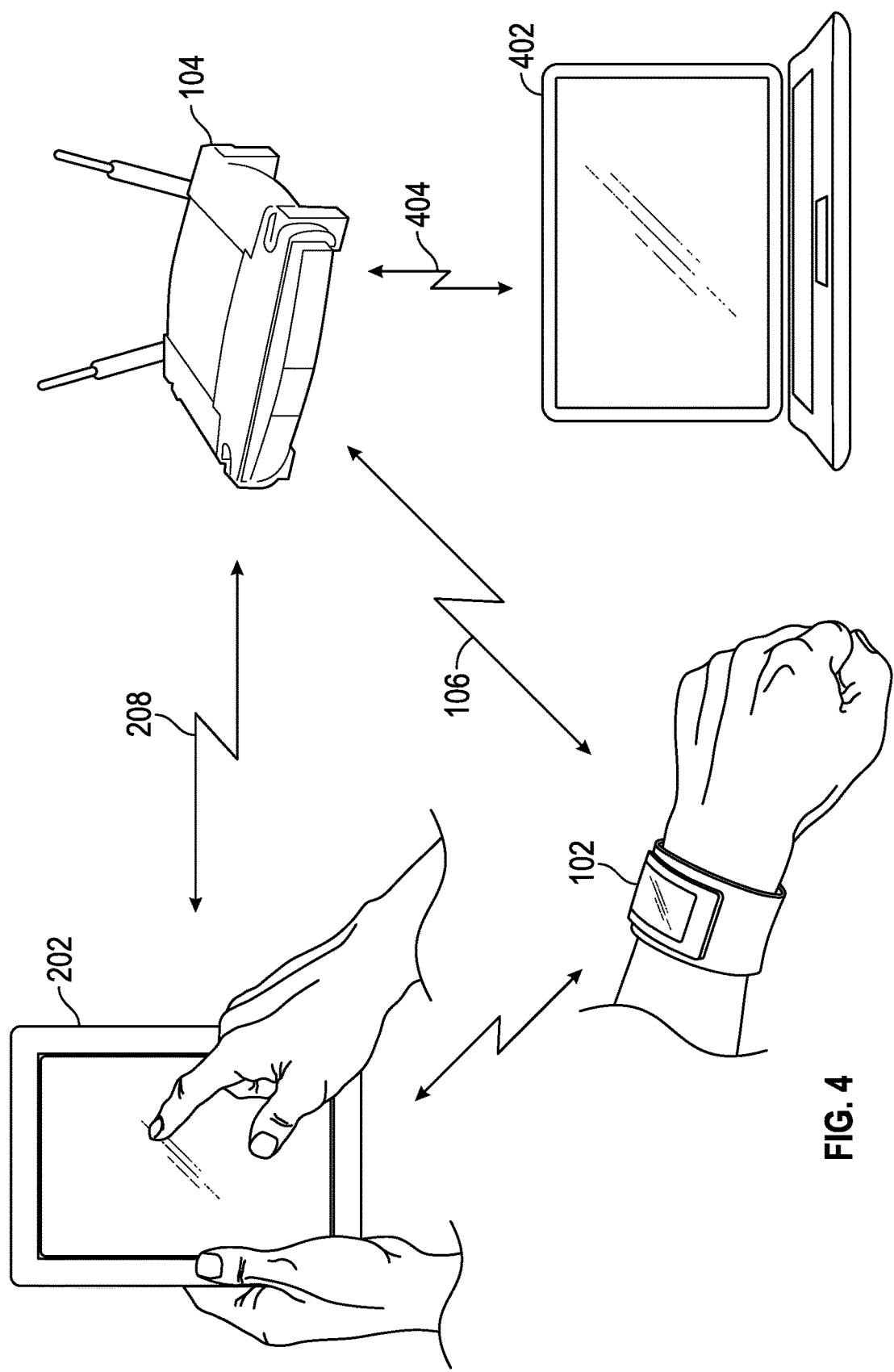
FIG. 4 illustrates an exemplary wireless device paired with another wireless device in order to delegate its ARP request discovery to the paired device according to examples of the disclosure.

As another example of traffic monitoring delegation, the paired device can also monitor for address resolution protocol (ARP) requests generated, for instance, by other devices on the wireless network. FIG. 4 illustrates an exemplary wireless device paired with another wireless device in order to delegate its ARP request discovery to the paired device according to examples of the disclosure. The network depicted in FIG. 4 is identical to the network depicted in FIG. 3 except that the network contains an additional wireless device, laptop 402. Per the 802.11 protocol, laptop 402 may want to communicate directly with another device on the network such as wireless device 102. It can do so by sending address resolution protocol (ARP) requests to wireless access point 104. Wireless access point 104 can then broadcast the ARP request to the network. The broadcast can be done by Internet Protocol (IP) address, meaning the wireless access point 104 can broadcast the IP address of the device that the requestor is requesting. The requestee can recognize its own IP address, such that when it sees ARP traffic intended for itself it can respond.

Using the network depicted in FIG. 4 as an illustration, if laptop 402 wishes to communicate with wireless device 102, it can send an ARP request to the wireless access point 104 via link 404 that includes the IP address of the wireless device. The wireless access point 104 can broadcast the ARP request that contains the IP address of the wireless device 102. Wireless device 102, when scanning, can receive the ARP request, recognize that the IP address of the ARP request corresponds to its own IP address, and establish a link 106 with the wireless access point 104 to field the ARP request.

However, if the wireless device is in WiFi sleep mode as described above, it may not be able to receive ARP requests that are intended for it. Therefore, in addition to scanning for AIDs, a wireless device can also delegate its ARP request monitoring functions to a paired device. For example, in reference to FIG. 4, when wireless device 102 desires to enter into WiFi sleep mode, it can also transmit its media access control (MAC) address to IP binding to paired device 202 via link 206. In other words, it can alert the paired device 202 that if a certain IP address is part of an ARP request, that IP address corresponds to the wireless device. Paired device 202, as part of it usual operation, can scan for beacons that include ARP requests sent by the wireless access point 104. When a paired device sees that the ARP request transmitted by the wireless access point indicates that the request is associated with the IP address of the wireless device 102, it can alert the wireless device via communication link 206 to exit WiFi sleep mode so that the wireless device can receive the incoming traffic.

Figure 5:
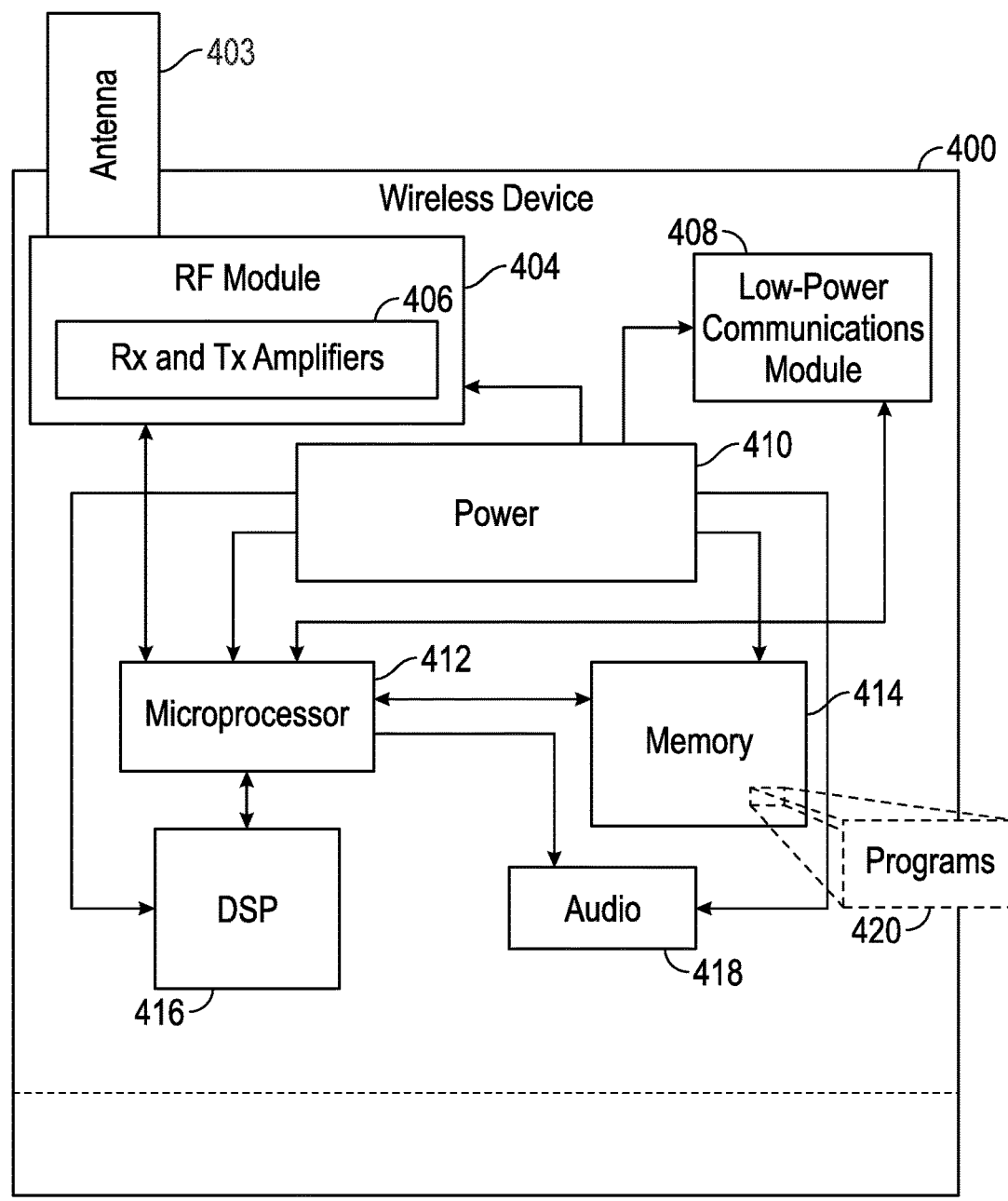
FIG. 5 illustrates an exemplary block diagram of a wireless device according to examples of the disclosure.

FIG. 5 illustrates an exemplary block diagram of a wireless device according to examples of the disclosure. The antenna 403 is designed to emit and receive electromagnetic waves according to a wireless or air interface standard such as IEEE 802.11. In one example, the antenna 403 is adapted to communicate with a wireless access point which provides the wireless device 400 with access to a broader network (e.g., the Internet). In many examples, the RF module 404 can have a transceiver adapted to convert the electromagnetic waves to current and ultimately to digital data, and conversely the digital data to current and then to electromagnetic waves (as applicable). One or more receive and or transmit amplifiers 406 may optionally be used to amplify signals for transmission, as is well known in the art. Wireless Device 400 can also contain a low-power communications module 408 that can be configured to operate low power, near field communications with proximal devices. As an example, module 408 can be configured to communicate with other devices using Bluetooth© LE.

The exemplary wireless device 400 of FIG. 4 can further have a central processing unit (such as integrated circuit microprocessor 412 and/or DSP, discussed below) which is adapted to perform basic processing operations of the wireless device 400. Memory 414 can have one or more storage devices capable of storing signals as bits of data. Memory 414 may therefore have any combination of volatile memory or non-volatile memory in accordance with the scope of the present application (for example, DRAM, SRAM, flash memory, EAROM, EPROM, EEPROM, and/or myriad types of other memory modules).

The wireless device 400 can optionally contain an audio controller 418 and one or more digital signal processors (DSPs) 416 for audio, signal, image and/or video processing. A power source 410 such as a battery provides power to the various components of the wireless device 400.

In one example, the microprocessor 416 is adapted to execute one or more software programs 420 stored in memory 414. The term "programs" can be understood to mean software modules that contain computer code to execute via a processor to operate the wireless device. The programs 420 can, upon detecting a specific control signal, modify the functionality of the wireless device 400 according to the type of signal detected, or alternatively, by the contents of the signal provided (e.g., commands embedded within a WiFi beacon as described elsewhere herein).

Therefore, according to the above, some examples of the disclosure are directed to A wireless device, the wireless device comprising: a first transceiver configured for communicating with a wireless access point; a second transceiver configured for communicating with a second wireless device; and a processor capable of: determining an idle state of the first transceiver; delegating one or more communication tasks to the second wireless device when the first transceiver is determined to be idle, wherein delegating also includes transmitting one or more sets of data to the second wireless device via the second transceiver; and configuring the first transceiver to operate in a sleep mode when the first transceiver is determined to be idle. Additionally or alternatively to one or more of the examples disclosed above, in some examples, the one or more communication tasks being delegated to the second wireless device includes scanning for a service set identifier (SSID) that is known to the wireless device. Additionally or alternatively to one or more of the examples disclosed above, in some examples, the one or more communication tasks being delegated to the second wireless device includes receiving one or more beacons sent by the wireless access point and determining if the wireless access point has data intended for the wireless device. Additionally or alternatively to one or more of the examples disclosed above, in some examples, the one or more communication tasks being delegated to the second wireless device includes scanning for address resolution protocol (ARP) requests intended for the wireless device.

Some examples of the disclosure are directed to a method of configuring a transceiver used to communicate with a wireless access point, the method comprising: detecting an idle state of a first transceiver; delegating one or more communication tasks to a second wireless device when an idle state of the first transceiver is detected, wherein delegating also includes transmitting one or more sets of data to the second wireless device via a second transceiver; and configuring the first transceiver to operate in a sleep mode when the first transceiver is determined to be idle. Additionally or alternatively to one or more of the examples disclosed above, in some examples, the one or more communication tasks being delegated to the second wireless device includes scanning for a service set identifier (SSID) that is known to the wireless device. Additionally or alternatively to one or more of the examples disclosed above, in some examples, the one or more communication tasks being delegated to the second wireless device includes receiving one or more beacons sent by the wireless access point and determining if the wireless access point has data intended for the wireless device. Additionally or alternatively to one or more of the examples disclosed above, in some examples, the one or more communication tasks being delegated to the second wireless device includes scanning for address resolution protocol (ARP) requests intended for the wireless device.

Some examples of the disclosure are directed to a non-transitory computer readable storage medium having stored thereon a set of instructions for configuring a transceiver used to communicate with a wireless access point, that when executed by a processor causes the processor to: detect an idle state of a first transceiver; delegate one or more communication tasks to a second wireless device when an idle state of the first transceiver is detected, wherein delegating also includes transmitting one or more sets of data to the second wireless device via a second transceiver; and configure the first transceiver to operate in a sleep mode when the first transceiver is determined to be idle. Additionally or alternatively to one or more of the examples disclosed above, in some examples, the one or more communication tasks being delegated to the second wireless device includes scanning for a service set identifier (SSID) that is known to the wireless device. Additionally or alternatively to one or more of the examples disclosed above, in some examples, the one or more communication tasks being delegated to the second wireless device includes receiving one or more beacons sent by the wireless access point and determining if the wireless access point has data intended for the wireless device. Additionally or alternatively to one or more of the examples disclosed above, in some examples, the one or more communication tasks being delegated to the second wireless device includes scanning for address resolution protocol (ARP) requests intended for the wireless device.

Some examples of the disclosure are directed to a wireless device, the wireless device comprising: a first transceiver configured for communicating with a wireless access point; a second transceiver configured for communicating with a second wireless device; and a processor capable of: receiving a signal from the second wireless device via the second transceiver indicating the second wireless device is entering an idle state; assuming responsibility for one or more communication tasks of the second wireless device upon receiving the signal from the second wireless device, wherein assuming the responsibility for one or more communication tasks of the second wireless device also includes receiving one or more sets of data from the second wireless device via the second transceiver; and configuring the first transceiver to perform the one or more communication tasks on behalf of the second wireless device. Additionally or alternatively to one or more of the examples disclosed above, in some examples, the one or more communication tasks assumed by the wireless device from the second wireless device includes scanning for a service set identifier (SSID) that is known to the second wireless device. Additionally or alternatively to one or more of the examples disclosed above, in some examples, the one or more communication tasks assumed by the wireless device from the second wireless device includes receiving one or more beacons sent by the wireless access point and determining if the wireless access point has data intended for the second wireless device. Additionally or alternatively to one or more of the examples disclosed above, in some examples, the one or more communication tasks assumed from the second wireless device includes scanning for address resolution protocol (ARP) requests intended for the second wireless device.

Some examples of the disclosure are directed to a method of configuring a transceiver used to communicate with a wireless access point, the method comprising: receiving a signal from a second wireless device indicating that the second wireless device is going to enter an idle state; assuming responsibility for one or more communication tasks from the second wireless device upon receiving the signal from the second wireless device, wherein assuming the responsibility for one or more communication tasks of the second wireless device includes receiving one or more sets of data from the second wireless device; and configuring a transceiver to perform the one or more communication tasks on behalf of the second wireless device. Additionally or alternatively to one or more of the examples disclosed above, in some examples, the one or more communication tasks assumed by the wireless device from the second wireless device includes scanning for a service set identifier (SSID) that is known to the second wireless device. Additionally or alternatively to one or more of the examples disclosed above, in some examples, the one or more communication tasks assumed by the wireless device from the second wireless device includes receiving one or more beacons sent by the wireless access point and determining if the wireless access point has data intended for the second wireless device. Additionally or alternatively to one or more of the examples disclosed above, in some examples, the one or more communication tasks assumed from the second wireless device includes scanning for address resolution protocol (ARP) requests intended for the second wireless device.

Some examples of the disclosure are directed to A non-transitory computer readable storage medium having stored thereon a set of instructions for configuring a transceiver used to communicate with a wireless access point, that when executed by a processor causes the processor to: receive a signal from a second wireless device via a first transceiver indicating that the second wireless device is going to enter an idle state; assume the responsibility for one or more communication tasks from the second wireless device upon receiving the signal from the second wireless device, wherein assuming the responsibility for one or more communication tasks of the second wireless device also includes receiving one or more sets of data from the second wireless device via the first transceiver; and configure a second transceiver to perform the one or more communication tasks on behalf of the second wireless device. Additionally or alternatively to one or more of the examples disclosed above, in some examples, the one or more communication tasks assumed by the wireless device from the second wireless device includes scanning for a service set identifier (SSID) that is known to the second wireless device. Additionally or alternatively to one or more of the examples disclosed above, in some examples, the one or more communication tasks assumed by the wireless device from the second wireless device includes receiving one or more beacons sent by the wireless access point and determining if the wireless access point has data intended for the second wireless device. Additionally or alternatively to one or more of the examples disclosed above, in some examples, the one or more communication tasks assumed from the second wireless device includes scanning for address resolution protocol (ARP) requests intended for the second wireless device.

Although examples of this disclosure have been fully described with reference to the accompanying drawings, it is to be noted that various changes and modifications including, but not limited to, combining features of different examples, omitting a feature or features, etc., as will be apparent to those skilled in the art in light of the present description and figures.

What is claimed is:

1. A wireless device comprising:
   a first transceiver configured to communicate with a wireless access point;
   a second transceiver configured to communicate with a second wireless device; and
   a processor configured to:
   transmit a known service set identifier (SSID) to a cloud of devices for retrieval by the second wireless device;
   detect an idle state of the first transceiver;
   delegate, via the second transceiver, one or more communication tasks to the second wireless device when the idle state of the first transceiver is detected, the one or more communication tasks comprising scanning for the known service set identifier (SSID); and
   configure the first transceiver to operate in a sleep mode when the idle state of the first transceiver is detected.

2. The wireless device of claim 1, wherein the processor is further configured to detect the idle state of the first transceiver when the first transceiver has not received data for a threshold amount of time.

3. The wireless device of claim 2, wherein the second transceiver is further configured to receive a message from the second wireless device that the known SSID has been detected, and the processor is further configured to cause the first transceiver to exit from the sleep mode when the message indicating that the known SSID has been detected has been received.

4. The wireless device of claim 2, wherein the first transceiver is further configured to enter the idle state after the first transceiver has scanned for the known SSID for another predetermined amount of time.

5. The wireless device of claim 1, wherein the one or more communication tasks being delegated to the second wireless device includes receiving one or more beacons sent by the wireless access point and determining if the wireless access point has data intended for the wireless device.

6. The wireless device of claim 5, the second transceiver further configured to transmit an association identification (AID) to the second wireless device to enable the second wireless device to determine if a particular received beacon indicates data intended for the wireless device.

7. The wireless device of claim 6, wherein the second transceiver is further configured to receive a message from the second wireless device indicating that a beacon containing the AID has been detected, and the processor is further configured to cause the first transceiver to exit from the sleep mode when the message indicating that the AID has been detected has been received.

8. The wireless device of claim 1, wherein the one or more communication tasks being delegated to the second wireless device includes scanning for address resolution protocol (ARP) requests intended for the wireless device.

9. The wireless device of claim 8, wherein the second transceiver is further configured to transmit a media access control (MAC) address to the second wireless device to enable the second wireless device to determine if a received ARP request is intended for the wireless device.

10. The wireless device of claim 9, wherein the second transceiver further configured to receive a message from the second wireless device indicating that a beacon containing the ARP request has been detected, and the processor is further configured to cause the first transceiver to exit from the sleep mode when the message indicating that the ARP request has been detected has been received.

11. A method comprising:
    detecting an idle state of a first transceiver of a first wireless device;
    delegating one or more communication tasks to a second wireless device when the idle state of the first transceiver is detected, the one or more communication tasks comprising determining if a wireless access point has data intended for the first wireless device, wherein the delegating comprises transmitting an association identification (AID) to the second wireless device via a second transceiver of the first wireless device to enable the second wireless device to determine if a particular beacon received from the wireless access point indicates that the wireless access point has data intended for the first wireless device; and
    configuring the first transceiver of the first wireless device to operate in a sleep mode when the idle state of the first transceiver is detected.

12. The method of claim 11, wherein the one or more communication tasks being delegated to the second wireless device includes scanning for a service set identifier (SSID) that is known to the first wireless device.

13. The method of claim 12, further comprising:
receiving a message from the second wireless device indicating that a known SSID has been detected; and
causing the first transceiver to exit from the sleep mode when the message indicating that the known SSID has been detected has been received.

14. The method of claim 12, further comprising transmitting a list of known SSIDs to a cloud for retrieval by the second wireless device.

15. The method of claim 12, further comprising causing the first transceiver to enter the idle state after the first transceiver has scanned for the SSID for a threshold amount of time.

16. The method of claim 15, further comprising:
receiving a message from the second wireless device indicating that a beacon containing the AID has been detected; and
causing the first transceiver to exit from the sleep mode when the message indicating that the AID has been detected has been received.

17. The method of claim 11, wherein detecting the idle state of the first transceiver comprises detecting when the first transceiver has not received data for a threshold amount of time.

18. The method of claim 11, wherein the one or more communication tasks being delegated to the second wireless device includes scanning for address resolution protocol (ARP) requests intended for the first wireless device.

19. The method of claim 18, further comprising transmitting a media access control (MAC) address to the second wireless device to enable the second wireless device to determine if a received ARP request is intended for the first wireless device.

20. The method of claim 19, further comprising:
receiving a message from the second wireless device indicating that a beacon containing the ARP request has been detected; and
causing the first transceiver to exit from the sleep mode when the message indicating that the ARP request has been detected has been received.

21. A non-transitory computer readable storage medium having stored thereon a set of instructions that when executed by a processor causes the processor to:

detect an idle state of a first transceiver in a first wireless device;
delegate one or more communication tasks to a second wireless device when the idle state of the first transceiver is detected, the one or more communication tasks comprising scanning for an address resolution protocol (ARP) request intended for the first wireless device, wherein the delegating comprises transmitting a media access control (MAC) address to the second wireless device via a second transceiver of the first wireless device to enable the second wireless device to determine if a received ARP request is intended for the first wireless device;
configure the first transceiver to operate in a sleep mode when the idle state of the first transceiver is detected;
receive, via the second transceiver, a message from the second wireless device indicating that a beacon containing the ARP request intended for the first wireless device has been detected; and
cause the first transceiver to exit from the sleep mode in response to receipt of the message.

22. The non-transitory computer readable storage medium of claim 21, wherein the one or more communication tasks being delegated to the second wireless device includes scanning for a service set identifier (SSID) that is known to the first wireless device.

23. The non-transitory computer readable storage medium of claim 22, the set of instructions further causing the processor to:
receive an other message from the second wireless device indicating that a known SSID has been detected; and
cause the first transceiver to exit from the sleep mode when the other message indicating that the known SSID has been detected has been received.

24. The non-transitory computer readable storage medium of claim 22, the set of instructions further causing the processor to transmit a list of known SSIDs to a cloud for retrieval by the second wireless device.

25. The non-transitory computer readable storage medium of claim 21, wherein the one or more communication tasks being delegated to the second wireless device includes receiving one or more beacons sent by a wireless access point, and the set of instructions further causing the processor to determine if the wireless access point has data intended for the first wireless device.

\* \* \* \* \*